Aug. 1, 1967          T. L. GLENN          3,333,691

COTTON BUR EXTRACTOR

Filed Aug. 7, 1964          4 Sheets-Sheet 1

THOMAS L. GLENN
INVENTOR.

BY: *C. W. Coffee*
        Atty.

Aug. 1, 1967 T. L. GLENN 3,333,691
COTTON BUR EXTRACTOR

Filed Aug. 7, 1964 4 Sheets-Sheet 2

THOMAS L. GLENN
INVENTOR.

BY:

THOMAS L. GLENN
INVENTOR.

Aug. 1, 1967  T. L. GLENN  3,333,691
COTTON BUR EXTRACTOR

Filed Aug. 7, 1964  4 Sheets-Sheet 4

THOMAS L. GLENN
INVENTOR.

BY:

United States Patent Office 3,333,691
Patented Aug. 1, 1967

3,333,691
COTTON BUR EXTRACTOR
Thomas L. Glenn, Lockney, Tex. 79241
Filed Aug. 7, 1964, Ser. No. 388,162
2 Claims. (Cl. 209—296)

This invention relates to processing stripped cotton and more particularly to a machine for removing burs and other trash from cotton after it has been stripped from the stalk.

Much cotton in the United States today is harvested by mechanically stripping the cotton from the stalk. Although this is an economical method of harvesting cotton, it also gathers burs, sticks, limbs, dried leaves, and other trash. It is advisable to remove this trash as soon as possible. It is desirable to remove the trash before the cotton is conveyed from the stripping mechanism to the trailer. First if the burs and other trash can be removed in the field and returned to the soil, beneficial humus is supplied to the soil. Also removal of trash is more difficult after the cotton with the trash was been packed in the trailer than when it is first harvested and has never been packed and the trash has not been into the lint. At present time the extraction of burs and removal of other trash by the stripping machine is limited because of the excessive weight and space required by equipment to perform this function.

I have devised a machine for removing burs and other trash from cotton in which the cotton is augered through a counter rotating perforated drum. As a refinement rotating bars orbit between the auger or screw conveyor and the screen. (As used in this specification and claims the verb "to auger" is defined as meaning to convey with an auger or screw conveyor. "Rotate" means that a part turns about its axis. "Orbit" means that the entire element circles about an axis outside of the confines of its body.)

An object of this invention is to provide a machine for separation of burs and other trash from the stripped cotton.

Another object is to provide such a machine which is compact and light weight and adaptable to be mounted on a tractor.

Still further objects are to provide a machine for the above purposes which requires a small amount of power to operate.

A further object is to provide a new method of removing burs and other trash from cotton.

Still further objects are to achieve the above with a device that is sturdy, durable, simple and reliable, yet inexpensive and easy to manufacture and operate.

Still further objects are to achieve the above with a method that is rapid, inexpensive, and does not require skilled operators.

The specific nature of the invention as well as other objects, uses, and advantages thereof will clearly appear from the following description and from the accompanying drawing, the different views of which:

Figure 1:
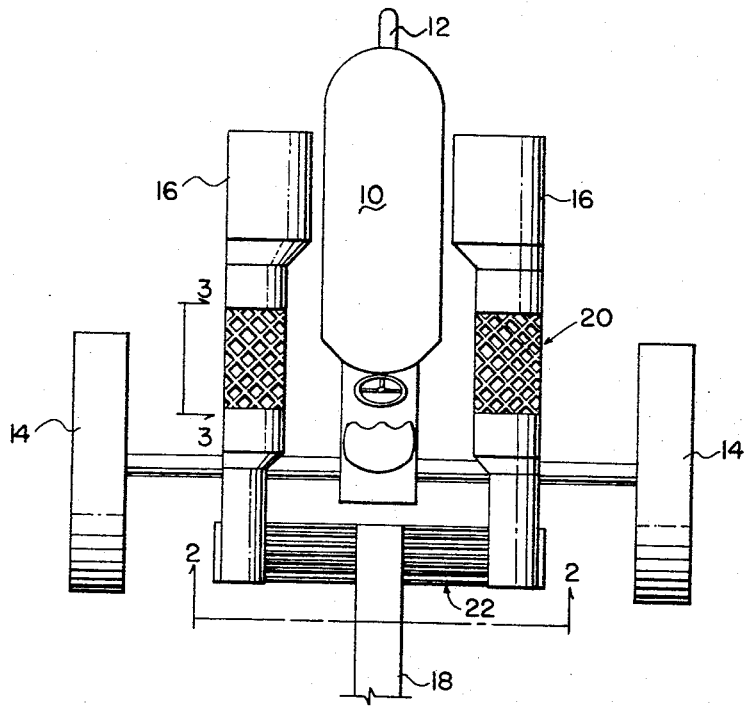
FIG. 1 is a plan view, schematic in nature, showing the invention as it would be installed on a tractor mounted stripper.

Referring more particularly to FIG. 1, there is schematically represented tractor 10 having a single front wheel 12 and two back wheels 14. Mounted on the tractor is conventional cotton stripping apparatus 16 which mechanism is designed to remove cotton from the stalk as is well known and therefor neither further shown or illustrated. The cotton is conveyed to the rear of the apparatus and moved through elevator 18 into a trailer (not shown) towed behind the tractor. During its conveyance from the stripper 16 to the elevator 18 the stripped cotton passes through two cleaners 20 and 22 to remove burs, sticks, trash, etc., therefrom. The first of these cleaners is the screen cleaner 20 and the second is the rod cleaner 22.

The rod cleaner 22 (FIGS. 2 and 4) has frame 24 which is attached to the tractor 10. Conveyor shaft 26 is mounted upon suitable supports and journaled for rotation upon the frame 24. The conveyor shaft 26 has helical vanes or flights 28 mounted thereon thus forming a spiral conveyor or auger or screw conveyor 29. The flights 28 are discontinuous in the center of the cleaner 22 so that the cotton is conveyed to the center and discharged there to the elevator 18 (not shown in FIG. 2). The flights 28 are right hand on one side and left hand on the other so that as the shaft 26 is rotated by pulley 30, the cotton is conveyed or augered from both ends toward the middle. Each of the outer ends of the screw conveyor 29 is surrounded by open box 32 which is adapted to receive the cotton as it is conveyed upward from the screen cleaner 20. The outer ends of each of the boxes 32 is closed by support 27 in which the shaft 26 is journaled.

Figure 2:
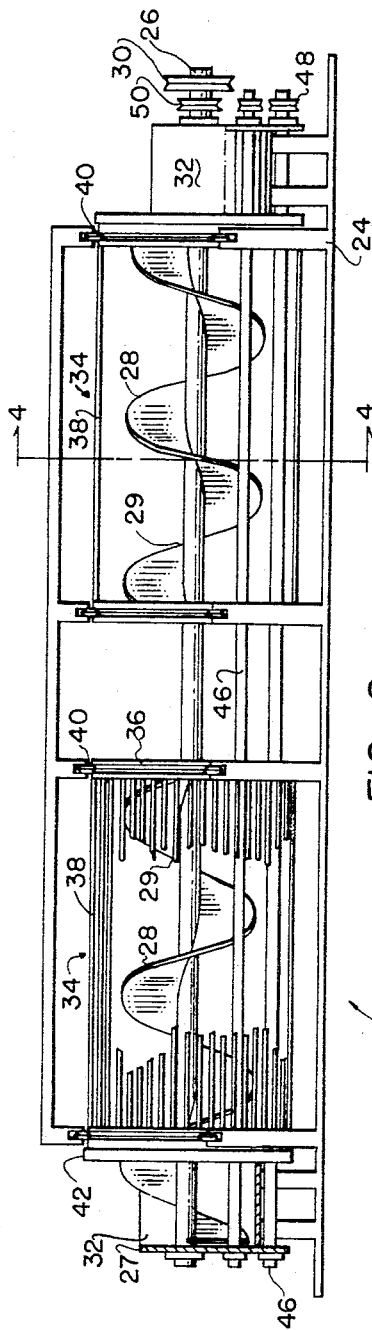
FIG. 2 is a rear elevational view with parts removed or broken away for clarity, substantially taken on line 2—2 of FIG. 1.
Figure 4:
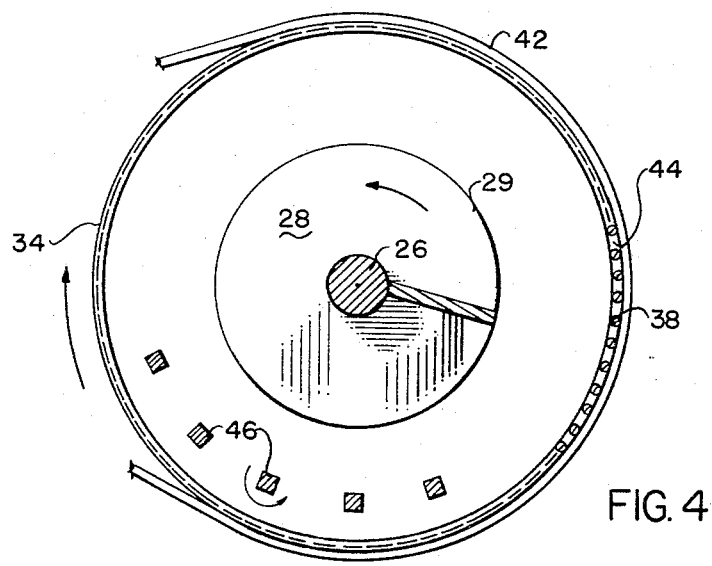
FIG. 4 is a sectional view taken substantially on line 4—4 of FIG. 2, with parts omitted for clarity.

The screw conveyor 29 is telescoped within drums 34. In the preferred embodiment the screw conveyors 29 are coaxial with the drums 34. The drums 34 have annular header 36 at each end. The drum is formed of longitudinally extending rods 38 extending from one header 36 to the other. The headers 36 have a V-shaped peripheral groove therein to fit with rollers 40 mounted on the frame 24, thus mounting each of the drums 34 for rotation. The drums 34 are rotated by belt 42 trained around an extension of one of the headers 36. The drive which powers the shaft 26 through the pulley 30 and the belt 42 is such that the shaft 26 and screw conveyor 29 are rotated in a first direction and the drums 34 are rotated in a second direction. Therefore it will be understood that inasmuch as the screw conveyor 29 augering the cotton rotates in one direction, the rotation of the drum can be described as counter rotating. Referring specifically to FIG. 4 it may be seen that the screw conveyor is mounted for counter clockwise rotation whereas the drum 34 is mounted for clockwise rotation. As shown in FIGS. 2 and 4, the drum 34 is constructed of ⅜ inch rods ⅞ inch on center so there is an opening or longitudinal slot 44 between the rods 38. I have found that this arrangement is particularly useful in removing the burs from the cotton particularly if the burs have been loosened or broken up by a screen cleaner 20 previously. If the drum rotates too fast it tends to throw locks of cotton through the slots 44 which is undesirable. If the drum 34 rotates too slow it does not tend to discharge as many burs as it does if it is turned faster. Within these broad limits readily determined by those with ordinary skill in the art, I find the speed of rotation is not critical.

It is desirable to include rotating bars 46 between the screw conveyor 29 and the drum 34. The rods 46 are journaled for rotation within the end support 27. Pulley 48 on the end of each of the bars 46 is rotated by a belt (not shown) from pulley 50 on the shaft 26. The bars 46 rotate in a counter clockwise direction (FIG. 4) so that the side adjacent to the drum 34 is moving in the opposite direction from the drum. Therefore the bars 46 rotate in the same direction as the screw conveyor 29. The bars prevent the cotton from moving upward with the side of the drum 34 as the drum rotates. The bars 46 keep most of the cotton down to the bottom of the drum where more of the cleaning takes place. They also tend to pick the cotton up from the bottom of the drum 34 and move it upward where it is moved along by the screw conveyor 29. Although other shapes may be used for the bars 46, I have had good success using one inch square bars.

Figure 3:
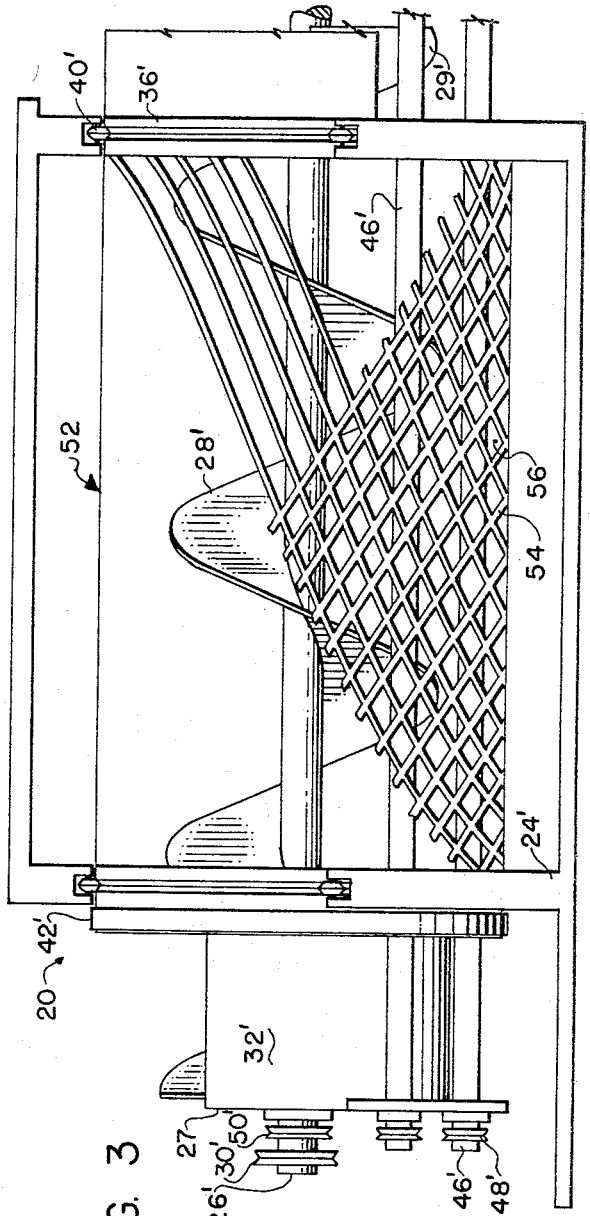
FIG. 3 is an elevational view taken on line 3—3 of FIG. 1 with parts broken away for clarity.

The screen cleaner 20 shown in FIG. 3 is quite similar to the rod cleaner 22 shown in FIGS. 2 and 4. Frame 24' is attached to the tractor 10 for supporting the cleaner 20. Conveyor shaft 26' is journaled for rotation upon support 27 which forms the end of the box 32' which is open to receive cotton directly from the stripper 16. The other end of the cleaner 20 is shown broken but it will be understood that the screw conveyor 29' extends onward to discharge cotton to be picked up by the rod cleaner 22. All the helical flights 28' extend in the same direction so that the cotton is augered upward as the screw conveyor 29' rotates in the cleaner 20. Drive pulley 30' rotates the screw conveyor 29' and bars 46' are rotated by a belt (not shown) extending between the bar pulleys 48' and the shaft pulley 50'. Drum 52 is constructed with annular header 36' at each end which is mounted for rotation by rollers 40 mounted within the frame 24'. The drum is rotated by a belt 42' in the opposite direction of the screw conveyor as previously discussed.

The drum 52 is constructed of a perforated screen 54. It is illustrated as expanded metal lathe, however, it will be understood that the screen 54 of the drum 52 could be a perforated sheet or a woven wire or other material that has openings 56 therein. I have found that the expanded metal lathe tends to break up and loosen the burs, sticks, and trash as well or better than the cylindrical rods 38. However, my experience has been that the trash is better separated or expelled from the cleaner by the elongated slots formed between cylindrical rods than it is through the diamond shaped openings or expanded metal lathe or through the square openings in the woven wire screens.

It is common to both the screen cleaner 20 and the rod cleaner 22 that the cleaners are greatly compacted by having the drum to rotate around the screw conveyor 29 as the cotton is augered through.

Figure 5:
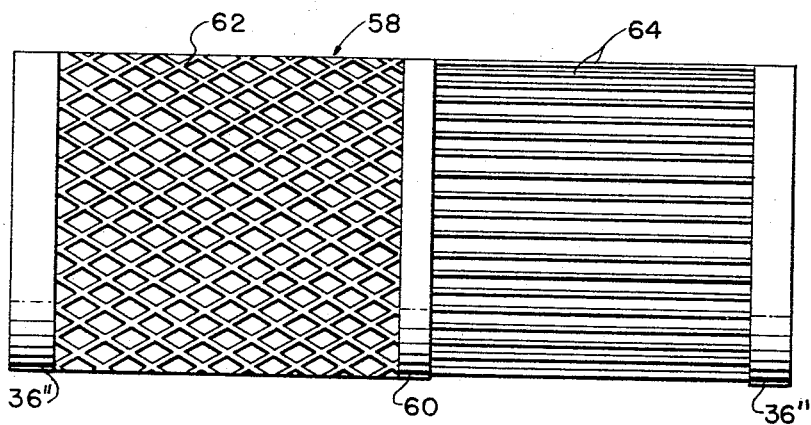
FIG. 5 is an elevational view of another embodiment of the drum.

FIG. 5 illustrates yet another embodiment for a drum 58 to be used in the cleaner according to this invention. In this case there is an annular header 36" at each end of the drum 58 and an annular reinforcing band 60 at the middle. The inlet half of the drum 58 has screen 62 shown as expanded metal lathe while the outlet has the openings in the form of slots between longitudinally extending rods 64. The embodiment of the drum 58 in FIG. 5 has not been shown with "V" shaped notches for rollers as much as it is contemplated that there are other ways that the drum 58 could be supported and rotated. The screen 62 at the inlet end lossens the burs and rods 64 at the outlet and expells them.

Figure 6:
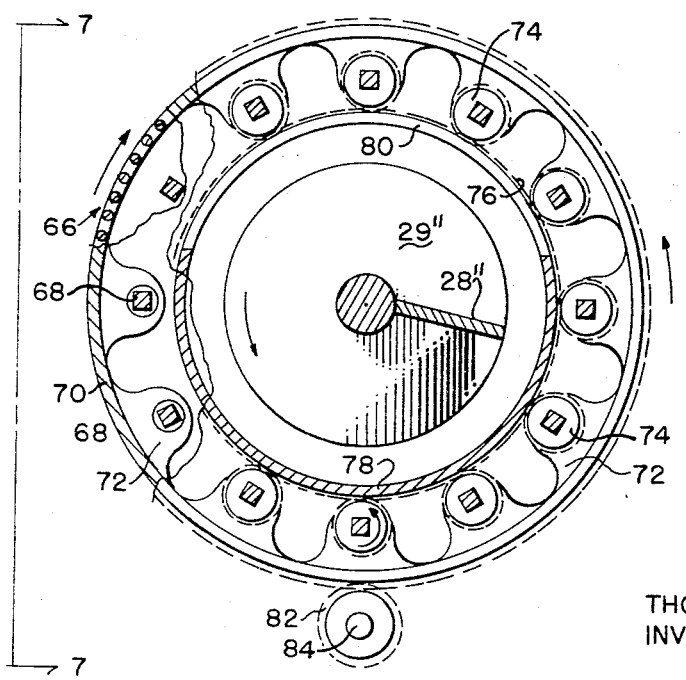
FIG. 6 is a sectional view of another embodiment illustrating orbiting rods, taken on line 6—6 of FIG. 7 with parts broken away.
Figure 7:
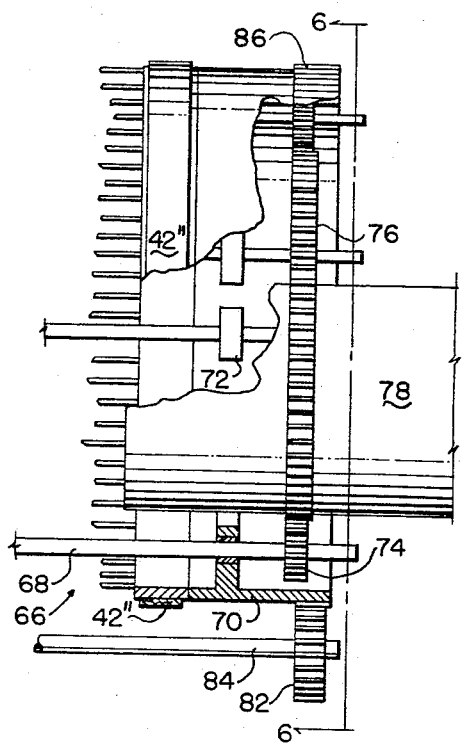
FIG. 7 is an elevational view as seen from line 7—7 FIG. 6 with parts broken away and omitted.

FIGS. 6 and 7 illustrate yet another embodiment. In this particular embodiment the screw conveyor 29" is mounted as before for counter clockwise rotation as seen in FIG. 6. Likewise the drum 66 is shown constructed of a plurality of longitudinal rods and it is rotated by the belt 42" in a clockwise direction as seen in FIG. 6. A plurality of bars 68 are journaled for rotation within bearings 72 attached to annular member 70. The bars 68 have gears 74 on one end thereof. These gears mesh with ring gear 76 which is mounted upon the open box 78 and a circular extension 80. The annular member 70 has gear teeth 86 on the exterior thereof and is rotated counter clockwise by drive pinion 82 which is mounted upon the powered shaft 84. Therefore it may be seen that the rotation of the powered shaft 84 rotates the annular member 70 which orbits the bars 68 around within the drum 66 exteriorly of the screw conveyor 29. The bars 68 are rotated as they orbit because the gears 74 mesh with the stationary ring gear 76 upon the box 78. It will be seen that the bars will rotate in a counter clockwise direction if the annular member 70 rotates in a counter clockwise direction. Therefore it may be seen that the edge of each of the bars 68 which is adjacent to the drum 66 will move in a direction opposite the drum 66 having the effect as previously discussed.

It will be understood that in the embodiment of FIGS. 6 and 7 that the drum 66 is supported by rollers (not shown in FIGS. 6 and 7 but shown in previous figures). The annular member 70 is supported by the bars 68 which are supported by the contact of the gears 74 on the ring gear 76. The shaft 84 is journaled to the frame (not shown).

It will be apparent that the embodiments shown are only exemplary and that various modifications can be made in construction, materials, and arrangement within the scope of the invention as defined in the appended claims.

I claim as my invention:
1. A machine for removing burs and other trash from stripped cotton comprising:
   (a) a screw conveyor,
   (b) means on one end of the conveyor operatively associated with one end of the conveyor for rotating in first direction the conveyor to move material along the conveyor,
   (c) an aligned drum surrounding the conveyor,
   (d) said drum having a plurality of openings in the circumference thereof,
   (e) means operatively associated with the drum for rotating the drum in a second direction,
   (f) longitudinally aligned bars extending between the screw conveyor and the drum, and
   (g) means operatively associated with the bars for rotating the bars.
2. The invention as defined in claim 1 with the additional limitations of:
   (h) said bars all journaled to an annular member near one end, and
   (j) means on the annular member for rotating the annular member, thus orbiting the bars.

References Cited

UNITED STATES PATENTS

| 31,641 | 3/1861 | Zulick | 171—128 |
| 2,654,201 | 10/1953 | Hyman | 56—33 X |
| 2,990,585 | 7/1961 | Sawyer | 19—200 |

FOREIGN PATENTS 64,050  11/1913  Austria.

HARRY B. THORNTON, *Primary Examiner.*

TIM R. MILES, *Examiner.*

L. H. EATHERTON, *Assistant Examiner.*